(12) United States Patent
Kraus et al.

(10) Patent No.: US 11,547,049 B2
(45) Date of Patent: Jan. 10, 2023

(54) WINDROWER VARIABLE RATE HEADER FLOATATION SYSTEM

(71) Applicant: DEERE & COMPANY, Moline, IL (US)

(72) Inventors: Timothy J. Kraus, Blakesburg, IA (US); Austin J. Karst, Bloomfield, IA (US)

(73) Assignee: DEERE & COMPANY, Moline, IL (US)

( * ) Notice: Subject to any disclaimer, the term of this patent is extended or adjusted under 35 U.S.C. 154(b) by 37 days.

(21) Appl. No.: 17/075,959

(22) Filed: Oct. 21, 2020

(65) Prior Publication Data
US 2022/0117161 A1  Apr. 21, 2022

(51) Int. Cl.
*A01D 41/14* (2006.01)
*F15B 13/04* (2006.01)
(Continued)

(52) U.S. Cl.
CPC .............. *A01D 41/145* (2013.01); *F15B 1/02* (2013.01); *F15B 1/021* (2013.01); *A01D 90/12* (2013.01);
(Continued)

(58) Field of Classification Search
CPC ..... A01D 41/145; F15B 1/02; F15B 13/0401; F15B 1/021; F15B 2211/20538; F15B 2211/50518; F15B 2211/50536; F15B 2211/511; F15B 2211/5157; F15B 2211/526; F15B 2211/625; F15B 2211/6313; F15B 2211/6658; F15B 2211/7052; F15B 2211/7128; F15B 2211/75; F15B 2211/761
See application file for complete search history.

(56) References Cited

U.S. PATENT DOCUMENTS 5,633,452 A  *  5/1997  Bebernes ............. A01D 41/145
                                                    56/208
5,964,077 A     10/1999  Guinn
(Continued)

FOREIGN PATENT DOCUMENTS

DE     102020204909 A1    10/2020

OTHER PUBLICATIONS

Extended European Search Report and Written Opinion issued in European Patent Application No. 21203054.8, dated Mar. 14, 2022, in 05 pages.

*Primary Examiner* — Dustin T Nguyen

(57) ABSTRACT

An agricultural machine includes a float cylinder interconnecting a header linkage system and a frame of the machine. A first rod side accumulator and a second rod side accumulator are both in fluid communication with a rod side fluid port of the float cylinder. A first accumulator control valve is positioned to control the first rod side accumulator, and is selectively controllable between an open position allowing fluid communication between the first rod side accumulator and the rod side fluid port of the float cylinder, and closed position blocking fluid communication between the first rod side accumulator and the rod side fluid port of the float cylinder. The system provides a slower first float response with the first accumulator control valve open, and a faster second float response with the first accumulator control valve closed.

12 Claims, 4 Drawing Sheets

(51) Int. Cl.
*F15B 1/02* (2006.01)
*A01D 90/12* (2006.01)

(52) U.S. Cl.
CPC . *F15B 13/0401* (2013.01); *F15B 2211/20538* (2013.01); *F15B 2211/50518* (2013.01); *F15B 2211/50536* (2013.01); *F15B 2211/511* (2013.01); *F15B 2211/5157* (2013.01); *F15B 2211/526* (2013.01); *F15B 2211/625* (2013.01); *F15B 2211/6313* (2013.01); *F15B 2211/6658* (2013.01); *F15B 2211/7052* (2013.01); *F15B 2211/7128* (2013.01); *F15B 2211/75* (2013.01); *F15B 2211/761* (2013.01)

(56) References Cited

U.S. PATENT DOCUMENTS

| | | | |
|---|---|---|---|
| 6,655,136 B2 * | 12/2003 | Holt | F16D 33/00 60/414 |
| 7,207,164 B2 * | 4/2007 | Bomleny | A01D 41/141 56/10.2 E |
| 7,555,883 B2 | 7/2009 | Fackler et al. | |
| 7,661,251 B1 * | 2/2010 | Sloan | A01D 41/141 60/413 |
| 7,703,266 B2 * | 4/2010 | Fackler | A01D 41/145 701/50 |
| 7,971,420 B1 | 7/2011 | Bollin | |
| 9,043,955 B2 | 6/2015 | Nafziger et al. | |
| 10,624,263 B2 * | 4/2020 | Dunn | A01D 41/141 |
| 11,272,659 B2 * | 3/2022 | Karst | A01D 41/127 |
| 2019/0029182 A1 | 1/2019 | Glade et al. | |
| 2022/0053693 A1 * | 2/2022 | Gahres | A01D 41/127 |

* cited by examiner

US 11,547,049 B2

WINDROWER VARIABLE RATE HEADER FLOATATION SYSTEM

TECHNICAL FIELD

The disclosure generally relates to an agricultural machine, such as a self-propelled windrower, having a header linkage system operable in a float operating condition.

BACKGROUND

Some agricultural machines are configured to receive or connect to a cutter head for cutting standing crop material. Such agricultural machines may be referred to as self-propelled windrowers and may often be configured to operate with several different styles and/or sizes of cutter heads. Each different size and/or style of cutter head may have different recommended operating settings for a header linkage system connecting the cutter head to the agricultural machine.

The agricultural machine and the attached cutter head may be configured to cut different crop materials. The crop materials include forages and grains. Because the crop materials have different characteristics, the header linkage system and cutter head may have to be positioned differently for different crop materials, or different cutter heads may have to be used for different crop materials.

Two commonly used styles of cutter heads include rotary style cutter heads which are often used for cutting forage crops, and draper style cutter heads which are often used for cutting grain crops. Each of the rotary style cutter heads and the draper style cutter heads may additionally come in different sizes. Both the rotary style cutter heads and the draper style cutter heads may be operated in either a fixed height operating condition, in which a position of the header linkage system is fixed relative to the frame of the agricultural machine so that the cutter head maintains a fixed height above the ground surface, or a float operating condition in which the header linkage system is allowed to move vertically relative to the frame to track the ground surface as the agricultural machine travels across the ground surface.

When operating in the float operating condition, it is desirable for the header linkage system to exhibit different operating characteristics for the different style of cutter heads, i.e., the rotary style cutter head and the draper style cutter head. For example, because the rotary style cutter heads may be moved more quickly across the ground surface compared to the draper style cutter heads, it is often desirable for the header linkage system to be configured to exhibit a quick floatation response to quickly move the cutter head downward to maintain contact with the ground surface. In contrast, because the draper style cutter heads use a sickle cutter-bar, they are moved more slowly across the ground surface than the rotary style cutter heads and are more sensitive to plugging with mud. Accordingly, it is often desirable for the header linkage system to be configured to exhibit a slow floatation response to move the draper style cutter heads downward at a more controlled rate so that the sickle cutter-bar does not dig into the ground surface.

SUMMARY

An agricultural machine is provided. The agricultural machine includes a frame, and a header linkage system attached to the frame. The header linkage system is configured for attaching a cutter head to the frame. The agricultural machine includes a fluid circuit including a tank operable to store a supply of a fluid, and a pressure source in fluid communication with the tank. The pressure source is operable to receive fluid from the tank and circulate the fluid through the fluid circuit. A float cylinder interconnects the header linkage system and the frame. The float cylinder includes a rod side fluid port in fluid communication with the pressure source. A first rod side accumulator is in fluid communication with the rod side fluid port of the float cylinder. A second rod side accumulator is in fluid communication with the rod side fluid port of the float cylinder. A first accumulator control valve is positioned to control the first rod side accumulator. The first accumulator control valve is selectively controllable between an open position and a closed position. When the first accumulator control valve is disposed in the open position, the first accumulator control valve allows fluid communication between the first rod side accumulator and the rod side fluid port of the float cylinder. When the first accumulator control valve is disposed in the closed position, the first accumulator control valve blocks fluid communication between the first rod side accumulator and the rod side fluid port of the float cylinder.

In one aspect of the disclosure, the first rod side accumulator and the second rod side accumulator combine to apply a first floatation response to the rod side fluid port of the float cylinder when the first accumulator control valve is disposed in the open position. When the first accumulator control valve is disposed in the closed position, only the second rod side accumulator applies a second flotation response to the rod side fluid port of the float cylinder. The first floatation response is slower than the second floatation response, such that the first floatation response moves the header linkage system back to the ground surface at a slower rate than the second floatation response. The first floatation response may be appropriate when a draper style header is attached to the header linkage system, whereas the second floatation response may be appropriate when a rotary style header is attached to the header linkage system.

In one aspect of the disclosure, the first rod side accumulator defines a first volume that is compressible in response to a fluid pressure above a first defined set point, and the second rod side accumulator defines a second volume that is compressible in response to a fluid pressure above a second defined set point. In one embodiment, the first volume is equal to the second volume. In another embodiment, the first volume is not equal to the second volume. In one embodiment, the first defined set point is equal to the second defined set point. In another embodiment, the first defined set point is not equal to the second defined set point. The first volume and the second volume, as well as the first defined set point and the second defined set point, may be designed to provide the desired response for each of the first float response and the second float response.

In one aspect of the disclosure, the agricultural machine includes a float control valve in fluid communication with the pressure source and the rod side fluid port of the float cylinder. The float control valve is selectively controllable between an open position and a closed position. When the float control valve is disposed in the open position, the float control valve allows fluid communication between the pressure source and the rod side fluid port of the float cylinder. When the float control valve is disposed in the closed position, the float control valve blocks fluid communication between the pressure source and the rod side fluid port of the float cylinder.

In one aspect of the disclosure, both the first rod side accumulator and the second rod side accumulator are both fluidically positioned within the fluid circuit between the float cylinder and the float control valve.

In one aspect of the disclosure, the float cylinder is a single acting hydraulic cylinder that is operable to retract in response to receiving fluid into the rod side fluid port of the float cylinder and extend in response to gravitational forces moving the header linkage system.

In one aspect of the disclosure, the agricultural machine may further a second accumulator control valve. The second accumulator control valve is positioned to control the second rod side accumulator. The second accumulator control valve is selectively controllable between an open position and a closed position. When the second accumulator control valve is disposed in the open position, the second accumulator control valve allows fluid communication between the second rod side accumulator and the rod side fluid port of the float cylinder. When the second accumulator control valve is disposed in the closed position, the second accumulator control valve blocks fluid communication between the second rod side accumulator and the rod side fluid port of the float cylinder.

In one aspect of the disclosure, the agricultural machine includes a header controller, which is configured to control the first accumulator control valve. The header controller may control the first accumulator control valve to its open position to operate the header linkage system at a first float condition with the first floatation response exhibiting a first header float return speed. The header controller may control the first accumulator control valve to its closed position to operate the header linkage system at a second float condition with the second floatation response exhibiting a second header float return speed.

In one implementation, the header controller may further be configured to simultaneously control the first accumulator control valve to its closed position and the second accumulator control valve to its closed position while opening the float control valve to operate the header linkage system in a lift condition to raise the header linkage system relative to the frame.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 2:
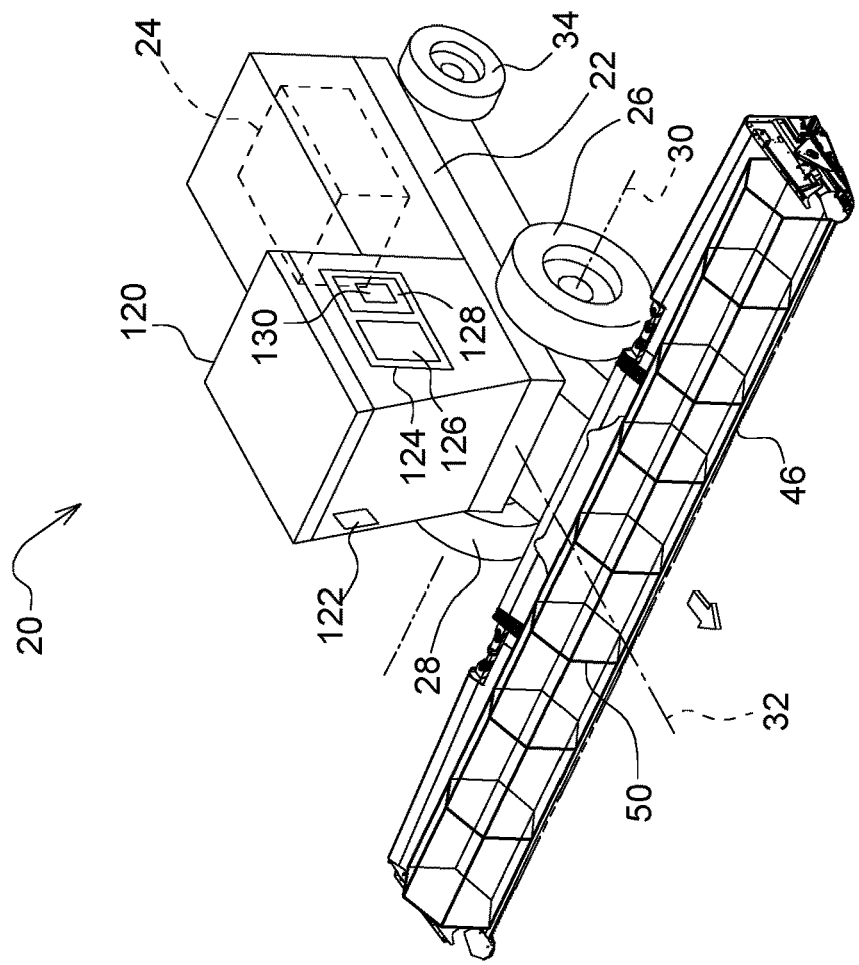
FIG. 2 is a schematic perspective view of the agricultural machine with a draper cutter head attached.
Figure 1:
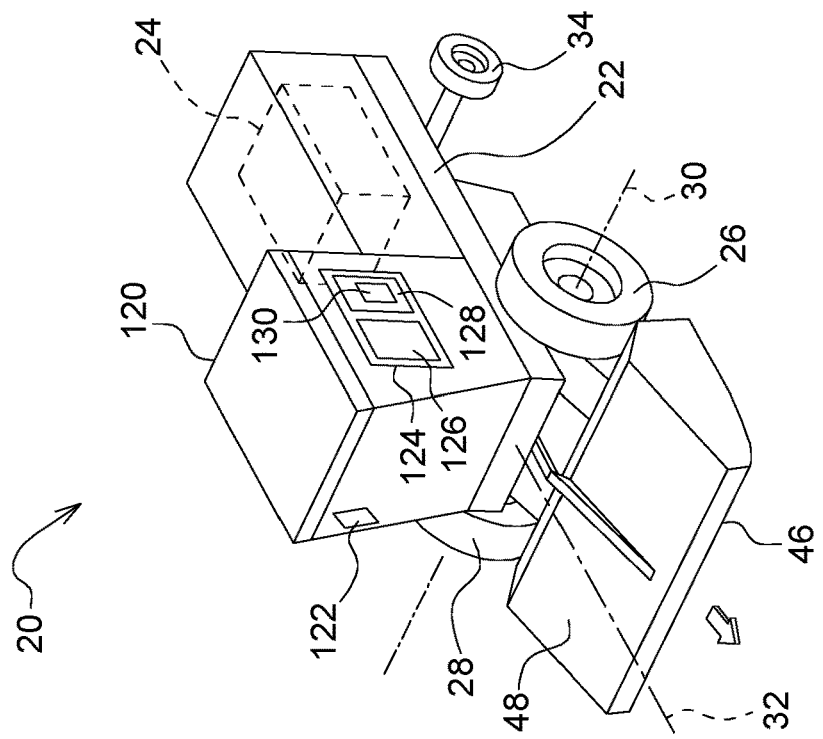
FIG. 1 is a schematic perspective view of an agricultural machine with a rotary cutter head attached.

Referring to the Figures, wherein like numerals indicate like parts throughout the several views, an agricultural machine is generally shown at 20 in FIGS. 1 and 2. The example embodiment of the agricultural machine 20 shown in FIGS. 1 and 2 includes, but is not limited to, a self-propelled windrower. However, it should be appreciated that the teachings of this disclosure may be applied to machines other than the example windrower depicted in the Figures.

Referring to FIGS. 1 and 2, the agricultural machine 20 includes a frame 22, which supports a prime mover 24. The prime mover 24 may include, but is not limited to, an internal combustion engine, an electric motor, a combination of both, or some other device capable of generating torque to power the agricultural machine 20. A left front drive wheel 26 and a right front drive wheel 28 are each mounted to the frame 22, adjacent a forward end of the frame 22. The left front drive wheel 26 and the right front drive wheel 28 are rotatable about a transverse axis 30. The transverse axis 30 is generally perpendicular to a longitudinal axis 32 of the frame 22.

As understood by those skilled in the art, the left front drive wheel 26 and the right front drive wheel 28 may be simultaneously rotated in the same rotational direction and at the same rotational speed about the transverse axis 30 to drive the agricultural machine 20 forward or rearward, depending upon the direction of rotation. Additionally, the left front drive wheel 26 and the right front drive wheel 28 may be rotated in the same rotational direction at different rotational speeds about the transverse axis 30, or in opposite rotational directions at the same or different rotational speeds about the transverse axis 30, in order to turn the agricultural machine 20.

Referring to FIGS. 1 and 2, the agricultural machine 20 further includes a left rear caster wheel 34 and a right rear caster wheel (not shown) attached to the frame 22. As used herein, the term "caster wheel" should be understood to include a wheel that is able to rotate a full three hundred sixty degrees (360°) about a respective generally vertical axis. As such, each of the left rear caster wheel 34 and the right rear caster wheel are rotatable a full three hundred sixty degrees (360°) about a respective generally vertical axis. The left rear caster wheel 34 and the right rear caster wheel may be attached to the frame 22 in a suitable manner. The specific manner in which the left rear caster wheel 34 and the right rear caster wheel are attached to the frame 22 is not pertinent to the teachings of this disclosure, are understood by those skilled in the art, and are therefore not described in detail herein.

Figure 3:
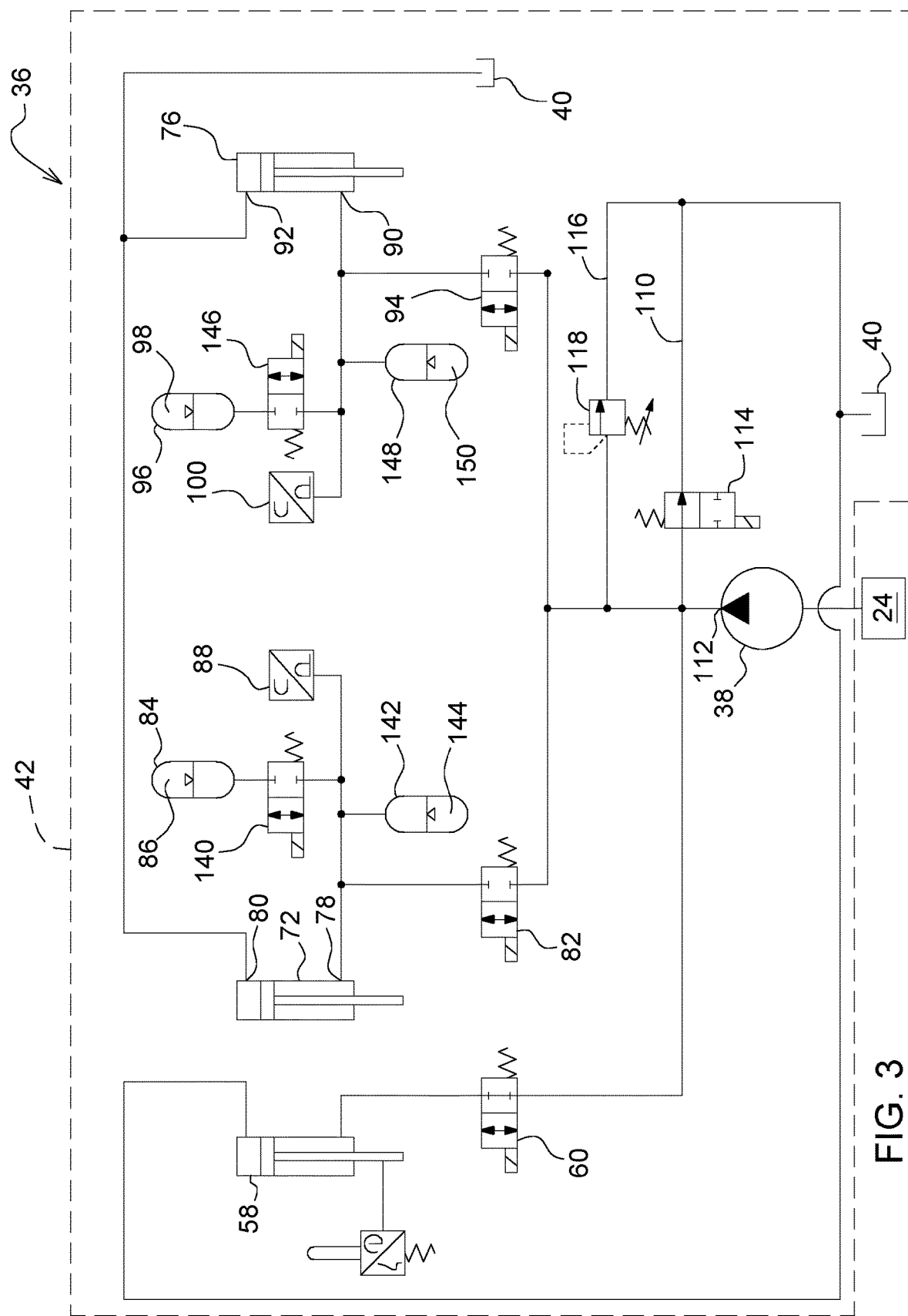
FIG. 3 is a schematic diagram of a hydraulic system of the agricultural machine configured in a second float condition.

Referring to FIG. 3, the agricultural machine 20 includes a hydraulic system 36. The hydraulic system 36 includes a pressure source 38 configured to supply a flow of pressurized fluid. The pressure source 38 may include, but is not limited to, a fluid pump that is drivenly coupled to the prime mover 24. The pressure source 38 draws fluid from a tank 40, and circulates the fluid through a fluid circuit 42. The tank 40 receives the fluid from the hydraulic system 36, stores the fluid, and supplies the fluid to the pressure source 38, e.g., the fluid pump. Fluid flow and/or pressure may be used to operate various components of the agricultural machine 20, as described in greater detail below.

Figure 4:
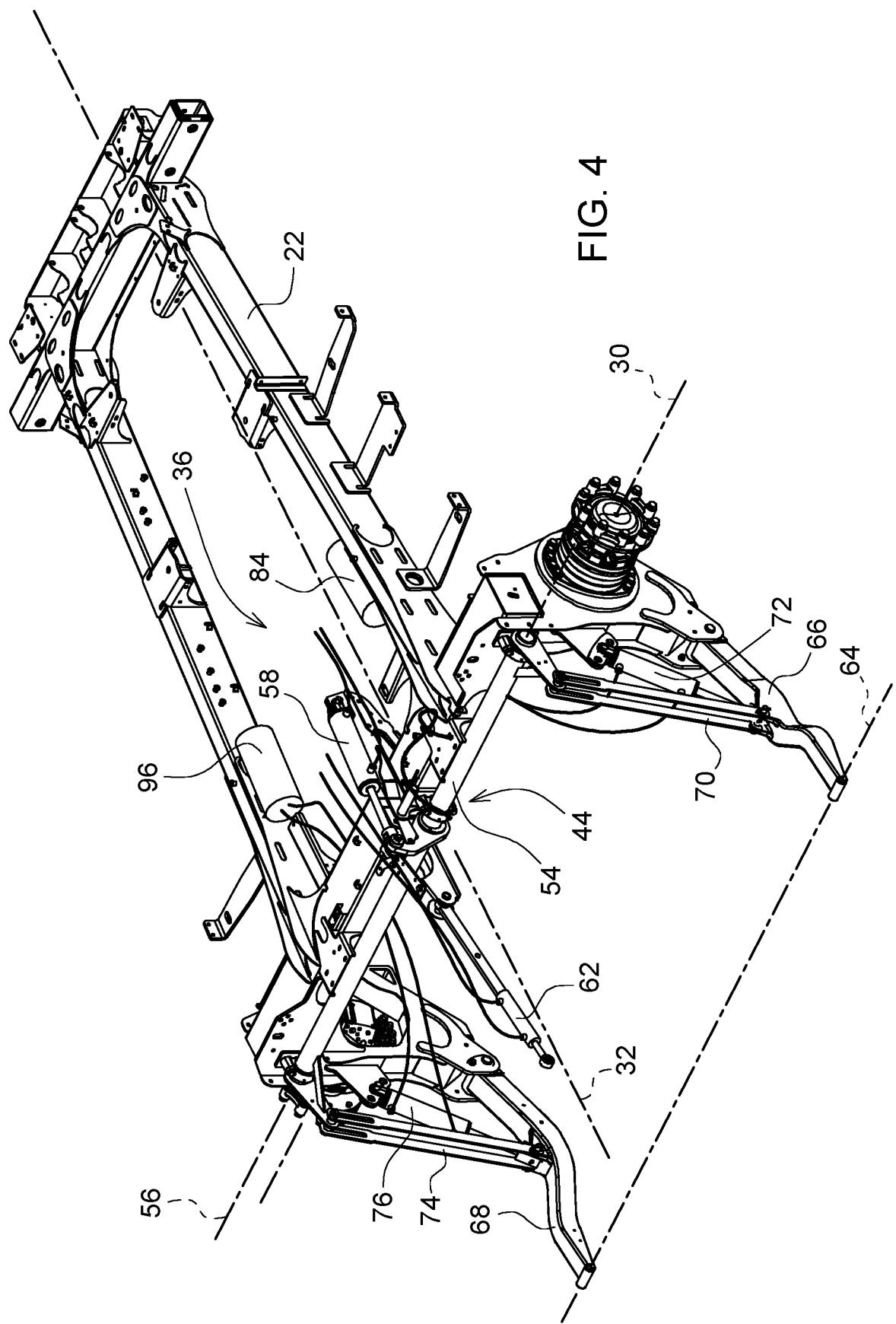
FIG. 4 is a schematic perspective view of a frame and a header linkage system of the agricultural machine.

Referring to FIG. 4, the agricultural machine 20 includes a header linkage system 44 attached to the frame 22. In the implementation shown in the Figures and described herein, the header linkage system 44 is attached to the frame 22 adjacent the forward end of the frame 22. The header linkage system 44 is configured for attaching a selected cutter head 46 from a plurality of different cutter heads 46 to the frame 22. The plurality of different cutter heads 46 may include a rotary cutter 48 such as shown in FIG. 1, or a draper cutter 50 such as shown in FIG. 2. It should be appreciated that the plurality of different cutter heads 46 may further include different sizes of each of the rotary cutter 48 and the draper cutter 50.

The fluid circuit 42 is configured for operating the header linkage system 44 in a float operating condition and a fixed height operating condition. When the fluid circuit 42 is configured to operate the header linkage system 44 in the float operating condition, the header linkage system 44 is allowed to move vertically relative to the frame 22, as the agricultural machine 20 moves across a ground surface, so that the cutter head 46 may track or follow the vertical undulations and changes in the ground surface.

Referring to FIGS. 3 and 4, the header linkage system 44 includes a rockshaft 54 rotatably mounted to the frame 22 for rotational movement about a shaft axis 56 that extends transverse to the longitudinal axis 32 of the frame 22. A lift cylinder 58 is attached to and interconnects the rockshaft 54 and the frame 22. The lift cylinder 58 is operable to rotate the rockshaft 54 about the shaft axis 56 in order to raise and lower the selected cutter head 46 relative to the ground surface. As such, the lift cylinder 58 is operated to control a vertical height of the selected cutter head 46 above the ground surface. In the example implementation described herein, the lift cylinder 58 is a single acting hydraulic cylinder in fluid communication with the hydraulic system 36. A lift control valve 60 controls fluid communication between the lift cylinder 58 and the pressure source 38. In other embodiments, the lift cylinder 58 may include a double acting hydraulic cylinder, an electrically actuated linear actuator, or some other device capable of extending and retracting. The lift cylinder 58 extends in response to fluid pressure and/or flow from the hydraulic system 36 in the usual manner, and is retracted by gravitational forces acting on the header linkage system 44 and/or the selected cutter head 46 attached to the header linkage system 44 as understood by those skilled in the art.

The header linkage system 44 may further include a tilt cylinder 62. The tilt cylinder 62 is attached to and interconnects the frame 22 and the selected cutter head 46 attached to the header linkage system 44. The tilt cylinder 62 is operable to rotate the selected cutter head 46 attached to the header linkage system 44 relative the ground surface. More specifically, the tilt cylinder 62 rotates the selected cutter head 46 about a tilt axis 64, which extends transverse to the longitudinal axis 32 of the frame 22 and through distal ends of a left connecting arm 66 and a right connecting arm 68. In the example implementation described herein, the tilt cylinder 62 is a double acting hydraulic cylinder in fluid communication with the hydraulic system 36. In other embodiments, the tilt cylinder 62 may include a single acting hydraulic cylinder, an electrically actuated linear actuator, or some other device capable of extending and retracting. The tilt cylinder 62 extends and retracts in response to fluid pressure and/or flow from the hydraulic system 36 in the usual manner as understood by those skilled in the art.

The header linkage system 44 includes the left connecting arm 66 and the right connecting arm 68 noted above. The left connecting arm 66 is rotatably attached to the frame 22 below the rockshaft 54, on a left side of the frame 22. A left linkage 70 is attached to and interconnects the left connecting arm 66 and the rockshaft 54. A left float cylinder 72 is attached to and interconnects the frame 22 and the left linkage 70. A respective forward end of the left float cylinder 72 is attached to the left linkage 70. The left float cylinder 72 extends rearward and vertically upward to a respective rearward end of the left float cylinder 72, which is attached to the frame 22.

The right connecting arm 68 is rotatably attached to the frame 22 below the rockshaft 54, on a right side of the frame 22. A right linkage 74 is attached to and interconnects the right connecting arm 68 and the rockshaft 54. A right float cylinder 76 is attached to and interconnects the frame 22 and the right linkage 74. A respective forward end of the right float cylinder 76 is attached to the right linkage 74. The right float cylinder 76 extends rearward and vertically upward to a respective rearward end of the right float cylinder 76, which is attached to the frame 22.

In the example implementation shown in the Figures and described herein, the left float cylinder 72 is a single acting hydraulic cylinder. As is understood by those skilled in the art, the left float cylinder 72 includes a case defining an interior volume. A piston is disposed within the interior volume of the case. A rod is attached to the piston within the interior volume of the case and extends to a distal end positioned outside the case. The piston and the rod are slideably moveable within the interior space and relative to the case to change a length of the left float cylinder 72. The left float cylinder 72 includes a rod side fluid port 78 and a piston side fluid port 80. As a single acting hydraulic cylinder, the rod side fluid port 78 of the left float cylinder 72 is in fluid communication with the pressure source 38 and may receive fluid from the pressure source 38 to retract the left float cylinder 72. The piston side fluid port 80 of the left float cylinder 72 is in fluid communication with the tank 40. Gravitational forces acting on the header linkage system 44 and the cutter head 46 urge the header linkage downward, thereby causing left float cylinder 72 to extend.

A left float control valve 82 is in fluid communication with and interconnects the pressure source 38 and the rod side fluid port 78 of the left float cylinder 72. The left float control valve 82 is fluidically positioned between the left float cylinder 72 and the pressure source 38. The left float control valve 82 is selectively controllable between an open position and a closed position. When the left float control valve 82 is disposed in the open position, the left float control valve 82 allows fluid communication between the pressure source 38 and the rod side fluid port 78 of the left float cylinder 72. The fluid circuit 42 may be controlled so that the left float cylinder 72 is operable to retract in response to receiving fluid into the rod side fluid port 78 of the left float cylinder 72 via the left float control valve 82. Additionally, when the left float control valve 82 is disposed in the open position, the fluid circuit 42 may be controlled to allow fluid communication between the rod side fluid port 78 of the left float cylinder 72 and the tank 40. When the left float control valve 82 is disposed in the closed position, the left float control valve 82 blocks or prevents fluid communication or flow between the pressure source 38 and the rod side fluid port 78 of the left float cylinder 72.

A first left rod side accumulator 84 is in fluid communication with the rod side fluid port 78 of the left float cylinder 72. The first left rod side accumulator 84 is fluidically positioned within the fluid circuit 42 in fluid communication with and/or between the rod side fluid port 78 of the left float cylinder 72 and the left float control valve 82. As understood by those skilled in the art and as used herein, an accumulator is a pressure vessel that holds a hydraulic fluid and a compressible gas separated by a flexible membrane or piston. The compressible gas is pre-charged to a pre-defined pressure. Hydraulic fluid introduced into the accumulator compresses the compressible gas until the pressure of the compressible gas matches that of the hydraulic fluid. The hydraulic fluid may be forced out of the accumulator by the compressible gas when the pressure of the hydraulic fluid drops below the pressure of the compressible gas. Accumulators may be used, for example, as energy storage devices and/or spring devices in the fluid circuit 42.

The left float cylinder 72 is in fluid communication with the first left rod side accumulator 84. The first left rod side accumulator 84 defines a first left rod side volume 86 that is compressible in response to a fluid pressure above a defined first left rod side set point. Fluid pressure within the first left rod side volume 86 defined by the first left rod side accumulator 84 may be controlled to provide a resistance against extension of the left float cylinder 72, as well as provide dampening or provide a spring affect or spring rate against extension of the left float cylinder 72.

A first left accumulator control valve 140 is positioned to control the first left rod side accumulator 84. The first left accumulator control valve 140 is selectively controllable between an open position and a closed position. When the first left accumulator control valve 140 is disposed in the open position, the first left accumulator control valve 140 allows fluid communication between the first left rod side accumulator 84 and the rod side fluid port 78 of the left float cylinder 72. When the first left accumulator control valve 140 is disposed in the closed position, the first left accumulator control valve 140 blocks fluid communication between the first left rod side accumulator 84 and the rod side fluid port 78 of the left float cylinder 72.

The fluid circuit further includes a second left rod side accumulator 142 in fluid communication with the rod side fluid port 78 of the left float cylinder 72. The second left rod side accumulator 142 is fluidically positioned within the fluid circuit 42 in fluid communication with and/or between the rod side fluid port 78 of the left float cylinder 72 and the left float control valve 82. The left float cylinder 72 is in fluid communication with the second left rod side accumulator 142. The second left rod side accumulator 142 defines a second left rod side volume 144 that is compressible in response to a fluid pressure above a defined second left rod side set point. Fluid pressure within the second left rod side volume 144 defined by the second left rod side accumulator 142 may be controlled to provide a resistance against extension of the left float cylinder 72, as well as provide dampening or provide a spring affect or spring rate against extension of the left float cylinder 72.

In one implementation, the first left rod side volume 86 may be equal to the second left rod side volume 144. However, in other implementations, the first left rod side volume 86 may be different than, i.e., is not equal to, the second left rod side volume 144. Additionally, the defined first left rod side set point of the first left rod side accumulator 84 may be equal to the defined second left rod side set point of the second left rod side accumulator 142. However, in other implementations, the defined first left rod side set point of the first left rod side accumulator 84 may be different than, i.e., is not equal to, the defined second left rod side set point of the second left rod side accumulator 142.

A left rod side pressure sensor 88 may be included to sense and monitor the fluid pressure applied to the rod side fluid port 78 of the left float cylinder 72 and the first left rod side accumulator 84.

In the example implementation shown in the Figures and described herein, the right float cylinder 76 is a single acting hydraulic cylinder. As is understood by those skilled in the art, the right float cylinder 76 includes a case defining an interior volume. A piston is disposed within the interior volume of the case. A rod is attached to the piston within the interior volume of the case and extends to a distal end positioned outside the case. The piston and the rod are slideably moveable within the interior space and relative to the case to change a length of the right float cylinder 76. The right float cylinder 76 includes a rod side fluid port 90 and a piston side fluid port 92. As a single acting hydraulic cylinder, the rod side fluid port 90 of the right float cylinder 76 is in fluid communication with the pressure source 38 and may receive fluid from the pressure source 38 to retract the right float cylinder 76. The piston side fluid port 92 of the right float cylinder 76 is in fluid communication with the tank 40. Gravitational forces acting on the header linkage system 44 and the cutter head 46 urge the header linkage downward, thereby causing right float cylinder 76 to extend.

A right float control valve 94 is in fluid communication with and interconnects the pressure source 38 and the rod side fluid port 90 of the right float cylinder 76. The right float control valve 94 is fluidically positioned between the right float cylinder 76 and the pressure source 38. The right float control valve 94 is selectively controllable between an open position and a closed position. When the right float control valve 94 is disposed in the open position, the right float control valve 94 allows fluid communication between the pressure source 38 and the rod side fluid port 90 of the right float cylinder 76. The fluid circuit 42 may be controlled so that the right float cylinder 76 is operable to retract in response to receiving fluid into the rod side fluid port 90 of the right float cylinder 76 via the right float control valve 94. Additionally, when the right float control valve 94 is disposed in the open position, the fluid circuit 42 may be controlled to allow fluid communication between the rod side fluid port 90 of the right float cylinder 76 and the tank 40. When the right float control valve 94 is disposed in the closed position, the right float control valve 94 blocks or prevents fluid communication or flow between the pressure source 38 and the rod side fluid port 90 of the right float cylinder 76.

A first right rod side accumulator 96 is in fluid communication with the rod side fluid port 90 of the right float cylinder 76. The first right rod side accumulator 96 is fluidically positioned within the fluid circuit 42 in fluid communication with and/or between the rod side fluid port 90 of the right float cylinder 76 and the right float control valve 94. As understood by those skilled in the art and as used herein, an accumulator is a pressure vessel that holds a hydraulic fluid and a compressible gas separated by a flexible membrane or piston. The compressible gas is pre-charged to a pre-defined pressure. Hydraulic fluid introduced into the accumulator compresses the compressible gas until the pressure of the compressible gas matches that of the hydraulic fluid. The hydraulic fluid may be forced out of the accumulator by the compressible gas when the pressure of the hydraulic fluid drops below the pressure of the compressible gas. Accumulators may be used, for example, as energy storage devices and/or spring devices in the fluid circuit 42.

The right float cylinder 76 is in fluid communication with the first right rod side accumulator 96. The first right rod side accumulator 96 defines a first right rod side volume 98 that is compressible in response to a fluid pressure above a defined first right rod side set point. Fluid pressure within the first right rod side volume 98 defined by the first right rod side accumulator 96 may be controlled to provide a resistance against extension of the right float cylinder 76, as well as provide dampening or provide a spring affect or spring rate against extension of the right float cylinder 76.

A first right accumulator control valve 146 is positioned to control the first right rod side accumulator 96. The first right accumulator control valve 146 is selectively controllable between an open position and a closed position. When the first right accumulator control valve 146 is disposed in the open position, the first right accumulator control valve 146 allows fluid communication between the first right rod side accumulator 96 and the rod side fluid port 90 of the right float cylinder 76. When the first right accumulator control valve 146 is disposed in the closed position, the first right accumulator control valve 146 blocks fluid communication between the first right rod side accumulator 96 and the rod side fluid port 90 of the right float cylinder 76.

The fluid circuit further includes a second right rod side accumulator 148 in fluid communication with the rod side fluid port 90 of the right float cylinder 76. The second right rod side accumulator 148 is fluidically positioned within the fluid circuit 42 in fluid communication with and/or between the rod side fluid port 90 of the right float cylinder 76 and the right float control valve 94. The right float cylinder 76 is in fluid communication with the second right rod side accumulator 148. The second right rod side accumulator 148 defines a second right rod side volume 150 that is compressible in response to a fluid pressure above a defined second right rod side set point. Fluid pressure within the second right rod side volume 150 defined by the second right rod side accumulator 148 may be controlled to provide a resistance against extension of the right float cylinder 76, as well as provide dampening or provide a spring affect or spring rate against extension of the right float cylinder 76.

In one implementation, the first right rod side volume 98 may be equal to the second right rod side volume 150. However, in other implementations, the first right rod side volume 98 may be different than, i.e., is not equal to, the second right rod side volume 150. Additionally, the defined first right rod side set point of the first right rod side accumulator 96 may be equal to the defined second right rod side set point of the second right rod side accumulator 148. However, in other implementations, the defined first right rod side set point of the first right rod side accumulator 96 may be different than, i.e., is not equal to, the defined second right rod side set point of the second right rod side accumulator 148.

A right rod side pressure sensor 100 may be included to sense and monitor the fluid pressure applied to the rod side fluid port 90 of the right float cylinder 76 and the first right rod side accumulator 96.

The fluid circuit 42 further includes a system return line 110. The system return line 110 interconnects an output 112 of the pressure source 38 and the tank 40 in fluid communication. A return valve 114 is in fluid communication with the system return line 110. The return valve 114 is fluidically positioned between the pressure source 38 and the tank 40, within the system return line 110. The return valve 114 is selectively controllable between an open position and a closed position. When the return valve 114 is disposed in the open position, the return valve 114 allows fluid communication or flow through the system return line 110 to the tank 40. When the return valve 114 is disposed in the closed position, the return valve 114 blocks or prevents fluid communication or flow through the system return line 110 to the tank 40.

The fluid circuit 42 may further include a pressure bypass line 116 including a pressure bypass valve 118. The pressure bypass line 116 and the pressure bypass valve 118 are in fluid communication with and fluidically disposed between the output 112 of the pressure source 38 and the tank 40. In response to fluid pressure within the fluid circuit 42 exceeding a defined maximum, the pressure bypass valve 118 may open to connect the output 112 of the pressure source 38 with the tank 40.

The agricultural machine 20 further includes an operator station 120, which houses control components of the agricultural machine 20. The control components may include, but are not limited to, an output and an input. The output is operable to convey a message to an operator. The input is operable to receive instructions from the operator. In the example implementation described herein, the input and the output are combined and implemented as a touch screen display 122. Messages may be communicated to the operator through the touch screen display 122, and data may be entered by the operator by touching the touch screen display 122 as is understood by those skilled in the art. It should be appreciated that the input and the output may differ from the example implementation described herein and may be separate or combined components. For example, the output may include, but is not limited to, a video only display, an audio speaker, a light board, etc. The input may include, but is not limited to, a mouse, a keyboard, a microphone, etc.

A header controller 124 is disposed in communication with the touch screen display 122, the tilt control valve, the lift control valve 60, the left float control valve 82, the left rod side pressure sensor 88, the right float control valve 94, the right rod side pressure sensor 100, the first left accumulator control valve 140, and the first right accumulator control valve 146. The header controller 124 is operable to receive data entry from the, left rod side pressure sensor 88, the right rod side pressure sensor 100, as well as the touch screen display 122. The header controller 124 may additionally send messages through the touch screen display 122, and control the operation of the tilt cylinder 62, the lift control valve 60, the left float control valve 82, the right float control valve 94, the first left accumulator control valve 140, and the first right accumulator control valve 146. While the header controller 124 is generally described herein as a singular device, it should be appreciated that the header controller 124 may include multiple devices linked together to share and/or communicate information therebetween. Furthermore, it should be appreciated that all or parts of the header controller 124 may be located on the agricultural machine 20 or located remotely from the agricultural machine 20.

The header controller 124 may alternatively be referred to as a computing device, a computer, a controller, a control unit, a control module, a module, etc. The header controller 124 includes a processor 126, a memory 128, and all software, hardware, algorithms, connections, sensors, etc., necessary to manage and control the operation of the touch screen display 122, the tilt cylinder 62, the lift control valve 60, the left float control valve 82, the right float control valve 94, the first left accumulator control valve 140, and the first right accumulator control valve 146. As such, a method may be embodied as a program or algorithm operable on the header controller 124. It should be appreciated that the header controller 124 may include any device capable of analyzing data from various sensors, comparing data, making decisions, and executing the required tasks.

As used herein, "controller" is intended to be used consistent with how the term is used by a person of skill in the art, and refers to a computing component with processing, memory, and communication capabilities, which is utilized to execute instructions (i.e., stored on the memory or received via the communication capabilities) to control or communicate with one or more other components. In certain embodiments, the header controller 124 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The header controller 124 may be in communication with other components on the agricultural machine 20, such as hydraulic components, electrical components, and operator inputs within the operator station 120. The header controller 124 may be electrically connected to these other components by a wiring harness such that messages, commands, and electrical power may be transmitted between the header controller 124 and the other components. Although the header controller 124 is referenced in the singular, in alternative embodiments the configuration and functionality described herein can be split across multiple devices using techniques known to a person of ordinary skill in the art.

The header controller 124 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 128 may include any non-transitory/tangible medium which participates in providing data or computer-readable instructions. The memory 128 may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The header controller 124 includes the tangible, non-transitory memory 128 on which are recorded computer-executable instructions, including a header attachment and control algorithm 130. The processor 126 of the header controller 124 is configured for executing the header attachment and control algorithm 130. The header attachment and control algorithm 130 implements a method of controlling the agricultural machine 20.

The header controller 124 may control the header linkage system 44 for operation between the float operating condition and the fixed height operating condition. When the header linkage system 44 is configured for the fixed height operating condition, the position of the header linkage system 44 is fixed relative to the frame 22 of the agricultural machine 20. When the header linkage system 44 is configured for the float operating condition, the header linkage system 44 allows the selected cutter head 46 to vertically track the ground surface during horizontal movement of the agricultural machine 20 over the ground surface.

The header controller 124 may receive commands from the operator via the touch screen display 122. The commands may include, but are not limited to, a selection of the desired operating condition, i.e., the fixed height operating condition or the float operating condition. If the float operating condition is selected, the header controller 124 may further receive commands from the operator selecting a desired float condition, i.e., a first float condition or a second float condition. The header controller 124 may then control the return valve 114, the left float control valve 82, the first left accumulator control valve 140, the right float control valve 94, and/or the first right accumulator control valve 146 to configure the fluid circuit 42 for the selected float condition, i.e., the first float condition or the second float condition.

When the hydraulic system 36 is configured to provide the first float condition, the hydraulic system provides a first floatation response that exhibits a first header float return speed. When the hydraulic system 36 is configured to provide the second float condition, the hydraulic system 36 provides a second floatation response that exhibits a second header float return speed. The first floatation response and the first header float return speed are slower than the second floatation response and the second header float return speed. Accordingly, an operator may select the first float condition for the first floatation response when operating the draper cutter 50 so that the draper cutter 50 is returned to the ground surface at a relatively slower rate when compared to the second float condition, whereas the operator may select the second float condition for the second floatation response when operating the rotary cutter 48 so that the rotary cutter 48 is returned to the ground surface at a relatively faster rate when compared to the first float condition.

Referring to FIG. 3, control of the fluid circuit 42 for controlling the header linkage system 44 in the first float condition is described. The first float condition of the hydraulic system 36 includes the left float control valve 82 and the right float control valve 94 being positioned in their respective closed positions. The first left accumulator control valve 140 and the first right accumulator control valve 146 are positioned in their respective open positions. This configuration allows both the first left rod side accumulator 84 and the second left rod side accumulator 142 to communicate with the rod side fluid port 78 of the left float cylinder 72. By using both the first left rod side accumulator 84 and the second left rod side accumulator 142, both the first left rod side volume 86 and the second left rod side volume 144 combine to apply a first floatation response to the rod side fluid port 78 of the left float cylinder 72. Additionally, this configuration allows both the first right rod side accumulator 96 and the second right rod side accumulator 148 to communicate with the rod side fluid port 90 of the left float cylinder 76. By using both the first right rod side accumulator 96 and the second right rod side accumulator 148, both the first right rod side volume 98 and the second right rod side volume 150 combine to apply the first floatation response to the rod side fluid port 90 of the right float cylinder 76. This configuration maximizes the available compressible volume of the accumulators 84, 96, 142, 148 to effectively lower the spring rate provided by the hydraulic system 36 to the left float cylinder 72 and the right float cylinder 76 respectively.

Referring to FIG. 3, control of the fluid circuit 42 for controlling the header linkage system 44 in the second float condition is described. The second float condition of the hydraulic system 36 includes the left float control valve 82 and the right float control valve 94 being positioned in their respective closed positions. The first left accumulator control valve 140 and the first right accumulator control valve 146 are positioned in their respective closed positions. This configuration enables only the second left rod side accumulator 142 to communicate with the rod side fluid port 78 of the left float cylinder 72. By using only the second left rod side accumulator 142, only the second left rod side volume 144 is available to apply the second floatation response to the rod side fluid port 78 of the left float cylinder 7. Additionally, this configuration enables only the second right rod side accumulator 148 to communicate with the rod side fluid port 90 of the left float cylinder 76. By using only the second right rod side accumulator 148, only the second right rod side volume 150 is available to apply the second floatation response to the rod side fluid port 90 of the right float cylinder 76. This configuration limits the available compressible volume to only the second left rod side volume 144 and the second right rod side volume 150 to effectively increase the spring rate provided by the hydraulic system 36 to the left float cylinder 72 and the right float cylinder 76 respectively.

Figure 5:
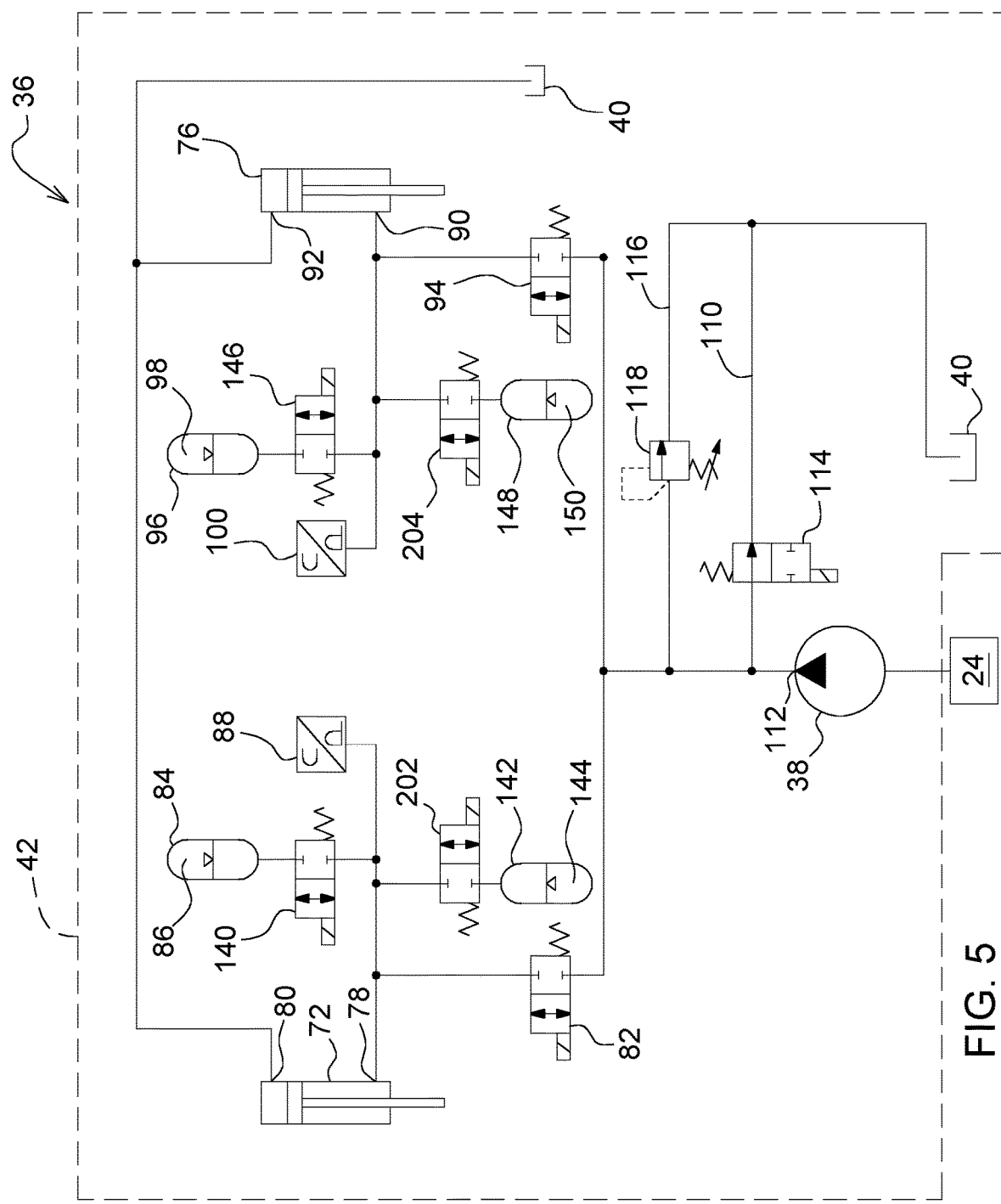
FIG. 5 is a schematic perspective view of an alternative implementation of the hydraulic system.

Referring to FIG. 5, an alternative embodiment of the hydraulic system is generally shown in at 200. Reference numerals used to identify features in FIGS. 1-4 are used to identify identical features in FIG. 5. The hydraulic system 200 shown in FIG. 5 eliminates the lift cylinder 58 and the lift control valve 60 shown in FIGS. 3-4. Additionally, the hydraulic system 200 shown in FIG. 5 includes a second left accumulator control valve 202 and a second right accumulator control valve 204.

The second left accumulator control valve 202 is positioned to control the second left rod side accumulator 142. The second left accumulator control valve 202 is selectively controllable between an open position and a closed position. When the second left accumulator control valve 202 is disposed in the open position, the second left accumulator control valve 202 allows fluid communication between the second left rod side accumulator 142 and the rod side fluid port 78 of the left float cylinder 72. When the second left accumulator control valve 202 is disposed in its open position, thereby allowing fluid communication between the second left rod side accumulator 142 and the rod side fluid port 78 of the left float cylinder 72, the first left accumulator control valve 140 may be controlled so that the hydraulic system 200 may operate in either the first float condition or the second float condition as described above with reference to FIGS. 3 and 4.

When the second left accumulator control valve 202 is disposed in the closed position, the second left accumulator control valve 202 blocks fluid communication between the second left rod side accumulator 142 and the rod side fluid port 78 of the left float cylinder 72. When the second left accumulator control valve 202 is disposed in the closed position, the first left accumulator control valve 140 may be controlled into its respective closed position blocking fluid communication between the first left rod side accumulator 84 and the rod side fluid port 78 of the left float cylinder 72. In this configuration, the left float control valve 82 may be controlled to operate the header linkage system 44 in a lift condition to raise and lower the header linkage system 44, thereby providing lift functionally to the header linkage system 44.

The second right accumulator control valve 204 is positioned to control the second right rod side accumulator 148. The second right accumulator control valve 204 is selectively controllable between an open position and a closed position. When the second right accumulator control valve 204 is disposed in the open position, the second right accumulator control valve 204 allows fluid communication between the second right rod side accumulator 148 and the rod side fluid port 90 of the right float cylinder 76. When the second right accumulator control valve 204 is disposed in its open position, thereby allowing fluid communication between the second right rod side accumulator 148 and the rod side fluid port 90 of the right float cylinder 76, the first right accumulator control valve 146 may be controlled so that the hydraulic system 200 may operate in either the first float condition or the second float condition as described above with reference to FIGS. 3 and 4.

When the second right accumulator control valve 204 is disposed in the closed position, the second right accumulator control valve 204 blocks fluid communication between the second right rod side accumulator 148 and the rod side fluid port 90 of the right float cylinder 76. When the second right accumulator control valve 204 is disposed in the closed position, the first right accumulator control valve 146 may be controlled into its respective closed position blocking fluid communication between the first right rod side accumulator 96 and the rod side fluid port 90 of the left float cylinder 76. In this configuration, the right float control valve 94 may be controlled to operate the header linkage system 44 in a lift condition to raise and lower the header linkage system 44, thereby providing lift functionally to the header linkage system 44.

Accordingly, in the implementation shown in FIG. 5, the left float cylinder 72 and the right float cylinder 76 may provide both the float functionality as well as the lift functionally performed by the lift cylinder 58 and the lift control valve 60 shown in FIGS. 3-4.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. An agricultural machine comprising:
   a frame;
   a header linkage system attached to the frame and configured for attaching a cutter head to the frame;
   a tank operable to store a supply of a fluid;
   a pressure source in fluid communication with the tank and operable to receive fluid from the tank and circulate the fluid through a fluid circuit;
   a float cylinder interconnecting the header linkage system and the frame, the float cylinder including a rod side fluid port in fluid communication with the pressure source;
   a first rod side accumulator in fluid communication with the rod side fluid port of the float cylinder;
   a second rod side accumulator in fluid communication with the rod side fluid port of the float cylinder;
   a first accumulator control valve positioned to control the first rod side accumulator, wherein the first accumulator control valve is selectively controllable between an open position allowing fluid communication between the first rod side accumulator and the rod side fluid port of the float cylinder, and a closed position blocking fluid communication between the first rod side accumulator and the rod side fluid port of the float cylinder; and
   wherein the first rod side accumulator and the second rod side accumulator combine to apply a first floatation response to the rod side fluid port of the float cylinder when the first accumulator control valve is disposed in the open position, and wherein only the second rod side accumulator applies a second flotation response to the rod side fluid port of the float cylinder when the first accumulator control valve is disposed in the closed position, with the first floatation response being slower than the second floatation response.

2. The agricultural machine set forth in claim 1, wherein the first rod side accumulator defines a first volume that is compressible in response to a fluid pressure above a first defined set point, and wherein the second rod side accumulator defines a second volume that is compressible in response to a fluid pressure above a second defined set point.

3. The agricultural machine set forth in claim 2, wherein the first volume is equal to the second volume.

4. The agricultural machine set forth in claim 2, wherein the first volume is not equal to the second volume.

5. The agricultural machine set forth in claim 2, wherein the first defined set point is equal to the second defined set point.

6. The agricultural machine set forth in claim 2, wherein the first defined set point is not equal to the second defined set point.

7. The agricultural machine set forth in claim 1, further comprising a float control valve in fluid communication with the pressure source and the rod side fluid port of the float cylinder, wherein the float control valve is selectively controllable between an open position allowing fluid communication between the pressure source and the rod side fluid port of the float cylinder, and a closed position blocking fluid communication between the pressure source and the rod side fluid port of the float cylinder.

8. The agricultural machine set forth in claim 7, wherein both the first rod side accumulator and the second rod side accumulator are both fluidically positioned within the fluid circuit between the float cylinder and the float control valve.

9. The agricultural machine set forth in claim 7, wherein the float cylinder is a single acting hydraulic cylinder operable to retract in response to receiving fluid into the rod side fluid port of the float cylinder and extend in response to gravitational forces moving the header linkage system.

10. The agricultural machine set forth in claim 7, further comprising a second accumulator control valve positioned to control the second rod side accumulator, wherein the second accumulator control valve is selectively controllable between an open position allowing fluid communication between the second rod side accumulator and the rod side fluid port of the float cylinder, and a closed position blocking fluid communication between the second rod side accumulator and the rod side fluid port of the float cylinder.

11. The agricultural machine set forth in claim 10, further comprising a header controller configured to simultaneously control the first accumulator control valve to its closed position and the second accumulator control valve to its closed position while opening the float control valve to operate the header linkage system in a lift condition to raise the header linkage system relative to the frame.

12. An agricultural machine comprising:
    a frame;
    a header linkage system attached to the frame and configured for attaching a cutter head to the frame;
    a tank operable to store a supply of a fluid;
    a pressure source in fluid communication with the tank and operable to receive fluid from the tank and circulate the fluid through a fluid circuit;
    a float cylinder interconnecting the header linkage system and the frame, the float cylinder including a rod side fluid port in fluid communication with the pressure source;
    a first rod side accumulator in fluid communication with the rod side fluid port of the float cylinder;
    a second rod side accumulator in fluid communication with the rod side fluid port of the float cylinder;
    a first accumulator control valve positioned to control the first rod side accumulator, wherein the first accumulator control valve is selectively controllable between an open position allowing fluid communication between the first rod side accumulator and the rod side fluid port of the float cylinder, and a closed position blocking fluid communication between the first rod side accumulator and the rod side fluid port of the float cylinder; and
    a header controller configured to control the first accumulator control valve to its open position to operate the header linkage system at a first float condition with the first floatation response exhibiting a first header float return speed, and control the first accumulator control valve to its closed position to operate the header linkage system at a second float condition with the second floatation response exhibiting a second header float return speed.

* * * * *